(12) United States Patent
Sandacz et al.

(10) Patent No.: US 8,999,248 B1
(45) Date of Patent: Apr. 7, 2015

(54) REACTOR WITH CLUSTERED SEPARATION DEVICES

(71) Applicant: UOP LLC, Des Plaines, IL (US)

(72) Inventors: Michael S. Sandacz, Glen Ellyn, IL (US); Michael A. Stine, Des Plaines, IL (US); Paolo Palmas, Des Plaines, IL (US); Sathit Kulprathipanja, Schaumburg, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 14/071,312

(22) Filed: Nov. 4, 2013

(51) Int. Cl.
| | | |
|---|---|---|
| *B01J 8/18* | (2006.01) | |
| *B01J 8/00* | (2006.01) | |
| *B01J 19/28* | (2006.01) | |

(52) U.S. Cl.
CPC ............. *B01J 8/0055* (2013.01); *B01J 19/28* (2013.01); *B01J 2208/00991* (2013.01)

(58) Field of Classification Search
CPC .................. B01J 8/005; B01J 2008/00991
USPC .......................................... 422/147, 213, 214
See application file for complete search history.

(56) References Cited

U.S. PATENT DOCUMENTS

| | | | | |
|---|---|---|---|---|
| 4,295,961 | A | * | 10/1981 | Fahrig et al. .................. 208/161 |
| 4,814,068 | A | | 3/1989 | Herbst et al. |
| 5,464,528 | A | | 11/1995 | Owen et al. |
| 6,383,965 | B1 | | 5/2002 | Xu |
| 7,090,081 | B2 | | 8/2006 | Vaughn et al. |
| 7,385,099 | B2 | | 6/2008 | Kuechler et al. |
| 7,442,345 | B2 | | 10/2008 | Trott et al. |
| 7,597,748 | B2 | | 10/2009 | Borley |
| 8,025,717 | B2 | | 9/2011 | Dries et al. |
| 8,226,818 | B2 | | 7/2012 | Sandacz |
| 2004/0064007 | A1 | | 4/2004 | Beech et al. |

FOREIGN PATENT DOCUMENTS

| | | |
|---|---|---|
| CN | 101451069 A | 6/2009 |
| CN | 201636851 U | 11/2010 |
| CN | 102226518 A | 10/2011 |
| CN | 202092117 U | 12/2011 |
| CN | 102901090 A | 1/2013 |
| WO | WO 2012/103790 A1 | 8/2012 |

OTHER PUBLICATIONS

Avidan et al., "Development of Catalytic Cracking Technology. A Lesson in Chemical Reactor Design," Ind. Eng. Chem. Res., 1990, 29, pp. 931-942.

* cited by examiner

*Primary Examiner* — Lessanework Seifu

(57) ABSTRACT

A fluid catalytic cracking reactor including a vessel, a chamber housed within the vessel, and a plurality of cyclones housed within the vessel, but externally of the chamber. The plurality of cyclones are arranged in a plurality of cyclone clusters, where each of the cyclone clusters includes a grouping of at least two cyclones that share common outlet piping for communication with the chamber. Alternatively, a fluid catalytic cracking reactor including a vessel, a chamber housed within the vessel, and a plurality of catalytic separation devices housed within the vessel, but externally of the chamber. The catalytic separation devices are in communication with the chamber via outlet piping. Preferably, the catalytic separation devices of the reactor are also in communication with a plenum via separator gas outlet piping, and optionally at least one of the catalytic separation devices feeds an outlet vapor stream into at least two different separator gas outlet piping members.

20 Claims, 9 Drawing Sheets

REACTOR WITH CLUSTERED SEPARATION DEVICES

The present invention relates generally to a reactor including a plurality of separation devices, and more specifically to a reactor used in a processing unit, such as in a fluid catalytic cracking (FCC) unit, that includes a plurality of catalyst separation devices, such as cyclones or second stage separators that are efficiently arranged within the reactor in order to enable a reduction in the vessel diameter compared with prior art arrangements. The present invention could also be applied to a regenerator, such as a regenerator that includes a first stage separation device, that is directly coupled with the second stage separators (such as second stage cyclones).

BACKGROUND OF THE INVENTION

A fluid catalytic cracking (FCC) unit includes a variety of different components that work together to perform the process of cracking of heavy hydrocarbons into lighter hydrocarbons with a fluidized stream of catalyst particles. One example of an FCC unit is disclosed in U.S. Pat. No. 8,266,818, issued on Jul. 24, 2012, and which is hereby incorporated by reference in its entirety. Of course, many other FCC units are known, and could be utilized with the present invention. As known in the art, the reactor and the regenerator are two of the important components of an FCC unit. Two of the functions of the reactor are: (i) separating the cracked product vapors from the spent catalyst by running the vapor through one or more catalyst separation devices, such as cyclones, second stage separators or third stage separators within the reactor vessel; and (ii) removing hydrocarbon vapors from the spent catalyst after it has gone through the catalyst separation device(s), before returning the spent catalyst to a catalyst regenerator. In the regenerator, the catalyst is further separated and regenerated by burning coke from the catalyst.

BRIEF SUMMARY OF THE INVENTION

Currently for an FCC reactor, such as a reactor with a riser disengager (as primary separators), the reactor vessel diameter (D) is set by the cyclone layout (as secondary stage separators). Historically, all of the cyclones have been positioned to be on the same radius, such as shown in Prior Art FIG. 1, which is an overhead view of an FCC reactor 5 that includes multiple cyclones 7, whose centers are all at radius R. With such a symmetrical layout, there will be even flow to all the cyclones 7 through the plurality of cross-over ducts 9. While this approach has generally been found to be reasonable for small to moderately sized reactor units, for large units (such as those units of about 100,000 bpsd (approximately 15,900,000 liters/day) in capacity), such a layout of the cyclones results in an excessive amount of open, unused, wasted space in the area that is radially inward of the circle of cyclones. In addition to FCC reactors, similar problems also apply to other types of reactors with multiple cyclones.

One of the objects of the present disclosure is to address various approaches to minimize the wasted space, or void, within the reactor vessel by more efficiently packing the reactor with cyclones, or other catalytic separation devices, to thereby enable for the reduction in the vessel diameter.

Certain embodiments of the present invention relate to a fluid catalytic cracking reactor including a vessel, a chamber housed within the vessel, and a plurality of cyclones housed within the vessel, but externally of the chamber. The plurality of cyclones are arranged in a plurality of cyclone clusters, where each of the cyclone clusters includes a grouping of at least three cyclones that share common outlet piping for communication with the chamber.

Other embodiments relate to a fluid catalytic cracking reactor that includes a vessel, a chamber housed within the vessel, and a plurality of cyclones housed within the vessel, but externally of the chamber. The plurality of cyclones are arranged in a plurality of cyclone clusters, with each of the cyclone clusters including a plurality of the cyclones. The cyclones are in communication with the chamber via outlet piping, and the outlet piping includes: (i) primary outlet pipes configured and arranged to communicate between the chamber and each of the cyclone clusters, with one of the primary outlet pipes being associated with each of the cyclone clusters; and (ii) cross-over ducts configured and arranged to communicate between one of the primary outlet pipes and one of the cyclones, such that, for each of the cyclone clusters, the number of cyclones is the same as the number of cross-over ducts.

Alternatively, the present invention also relates to embodiments of a fluid catalytic cracking reactor including a vessel, a chamber housed within the vessel, and a plurality of catalytic separation devices housed within the vessel, but externally of the chamber. The catalytic separation devices are in communication with the chamber via outlet piping. Preferably, the catalytic separation devices of the reactor are also in communication with a plenum via separator outlet piping, and optionally at least some of the catalytic separation devices feed an outlet vapor stream into at least two different separator outlet piping members.

BRIEF DESCRIPTION OF THE DRAWING

Preferred embodiments of the present invention are described herein with reference to the drawing wherein.

DETAILED DESCRIPTION OF THE INVENTION

Examples of reactors with various configurations of catalyst separation devices and piping to and from the devices will be discussed while referring to FIGS. 2-10. Although FIGS. 2-10 relate to FCC reactors, the concepts described herein can be applied to other types of reactors. Further, the various figures show examples of different catalyst separation device arrangements as well as different piping arrangements. It should be noted that the present inventors have contemplated combining features of two, or more, embodiments together (such as using the piping arrangement of one embodiment with the cluster configuration of another embodiment), but in the interest of a compact disclosure, all such combinations have not been shown in the figures.

Figure 2:
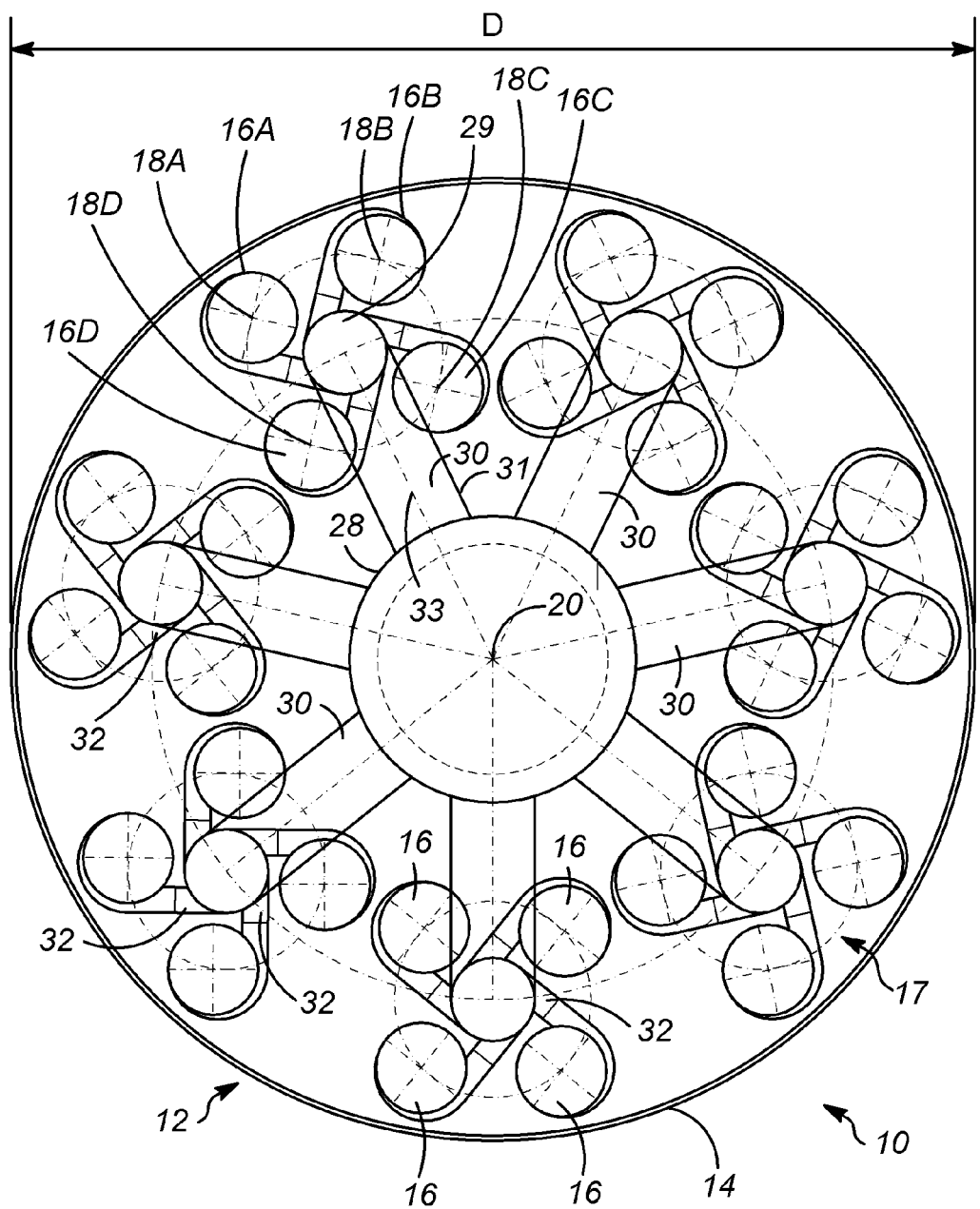
FIG. 2 is a schematic overhead view of one example of a cyclone configuration of the present invention.

Turning now to FIG. 2, one example of a catalyst separation device configuration will be described. FIG. 2 is a top view of the interior of a reactor 10, such as an FCC reactor, which includes a vessel 12 defined by a vessel wall 14. As can be seen in FIG. 2, the catalyst separation devices in this embodiment are cyclones 16 that are arranged in a plurality of clusters 17. Although this embodiment, and most of the other embodiments, each include seven clusters of four cyclones each, other numbers of clusters (such as, but not limited to, between two and fifteen clusters, or more) are contemplated as being within the scope of the invention, as well as having each cluster include other than four cyclones. For example, although four cyclones per cluster have been found to provide an efficient use of the space within the vessel wall 14, clusters of two or three cyclones are also possible, as well as clusters with more than four cyclones.

In the FIG. 2 embodiment, the center points 18A and 18B of two of the cyclones (cyclones 16A and 16B) within each cluster 17 are arranged to be at the same radius from the center point 20 (in plan view) of the reactor vessel 12, whose vessel wall 14 includes a side wall that is preferably generally cylindrical. Similarly, the center points 18C and 18D of the other two of the cyclones (cyclones 16C and 16D) are also arranged to be at the same radius from the center point 20 of the reactor, but at a different radius than the radius of center points 18A and 18B. Such a configuration results in the cyclones 16A-16D within a single cluster 17 being symmetric about a vertical manifold portion 29 of piping portion 30, where piping portion 30 will be referred to as a primary outlet pipe, as described more fully below. In other words, center points 18A-18D of the cyclones 16A-16D are equidistant from the centerpoint of manifold portion 29. Such an arrangement also allows for the vertically extending barrels of the cyclones 16 (see FIG. 4) to evenly straddle the manifold portion 29 of associated primary outlet pipe 30. Further, the radially inward cyclones 16C and 16D are evenly spaced from a generally horizontal portion 31 (FIG. 4) of their associated primary outlet pipe 30, so that dip legs 42 are not hindered by outlet pipes 30 or chamber 21. Also, the center points 18A-18D of the cyclones 16A-16D are arranged symmetrically about center line 33 of the generally horizontal portion 31 of the primary outlet pipe 30.

Further, each of the primary outlet pipes 30 (including the generally horizontal portion 31 and the vertical manifold portion 29) is in communication between the chamber 21 and the cyclones 16 of an associated one of the cyclone chambers 17, but not in communication with the cyclones 16 of another one of the cyclone clusters 17.

Figure 1:
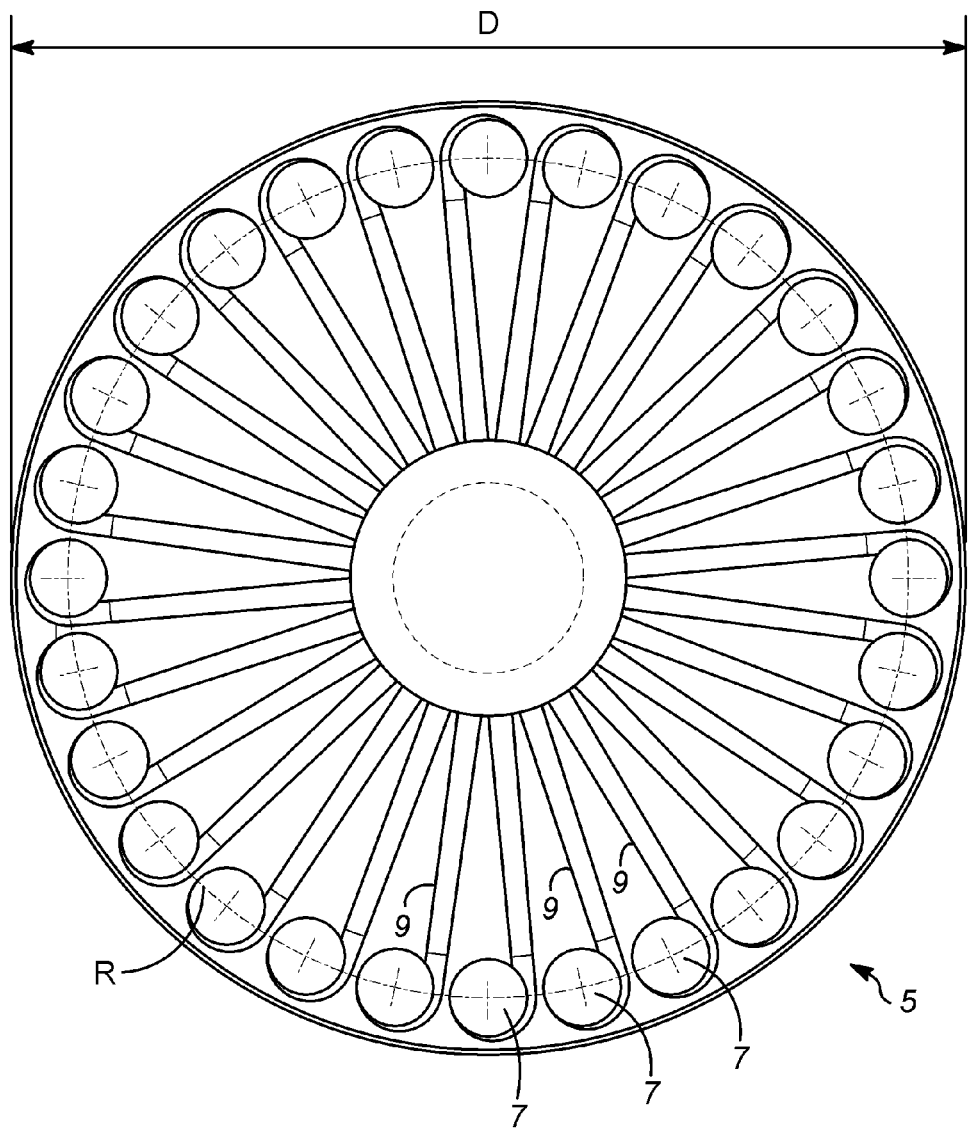
FIG. 1 is a schematic overhead view of a cyclone configuration of a prior art reactor vessel shown with cyclones arranged in the customary manner along a common radius.

As can be seen from a comparison of FIG. 2 with Prior Art FIG. 1, use of clusters 17 of multiple cyclones allows for there to be less wasted space in the interior of the reactor vessel. The cluster configuration of FIG. 2 also allows for the same number of cyclones (twenty eight in this example) to be positioned within a reactor vessel of lesser diameter D than the diameter of the vessel of Prior Art FIG. 1. By way of example only, assuming that the diameter D of the reactor vessel of Prior Art FIG. 1 is 19900 mm, the reactor vessel diameter of FIG. 2 can be reduced to 16900 mm, for the same number of cyclones, with the cyclones being the same size as in Prior Art FIG. 1, resulting in an approximately 15% reduction in vessel diameter. Efficient use of the cyclone clusters for larger units described herein are believed to result in vessel diameters of between approximately 70% to approximately 95% of the diameters of prior art vessels in which all cyclones are arranged at the same radius.

Figure 3:
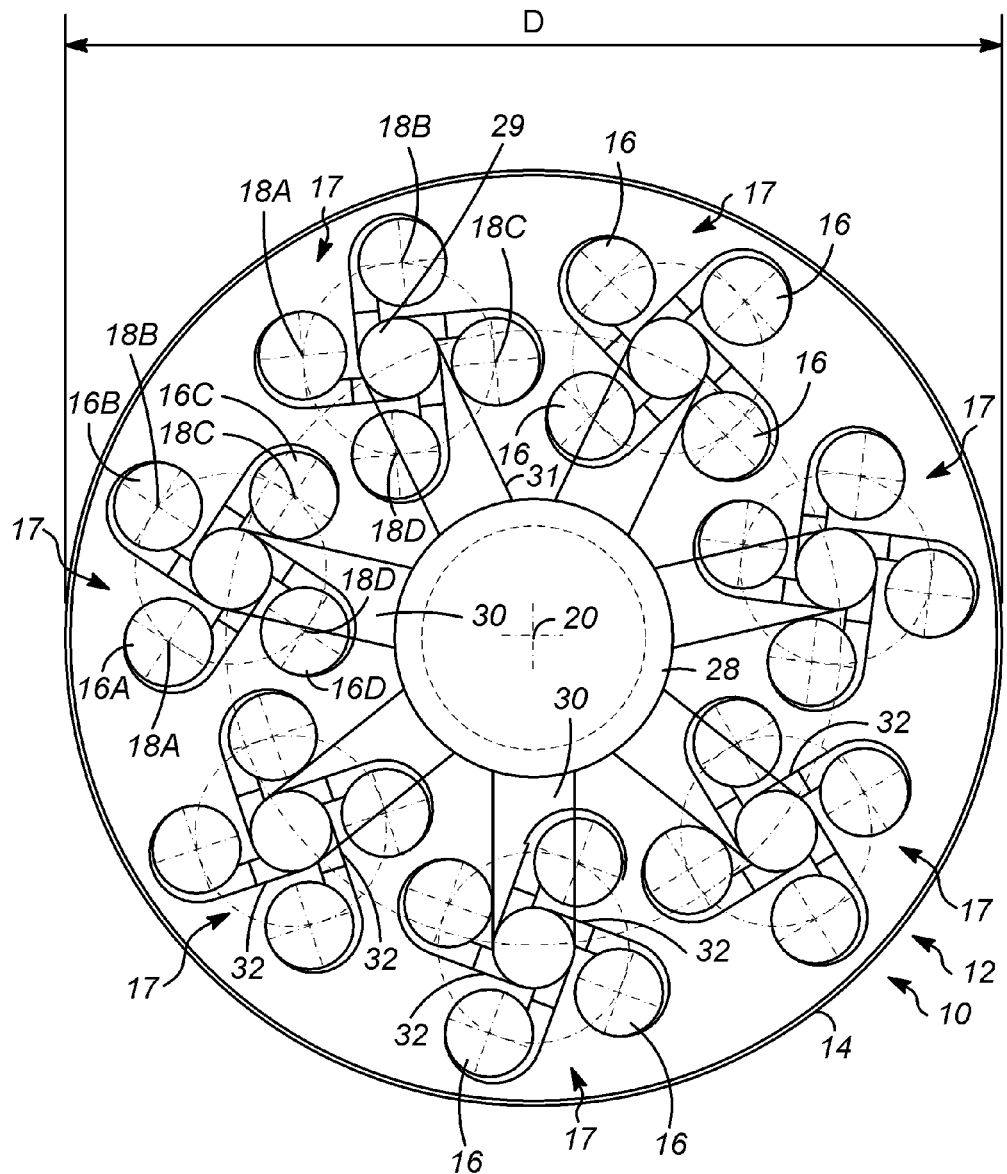
FIG. 3 is a schematic overhead view of another example of a cyclone configuration of the present invention.
Figure 4:
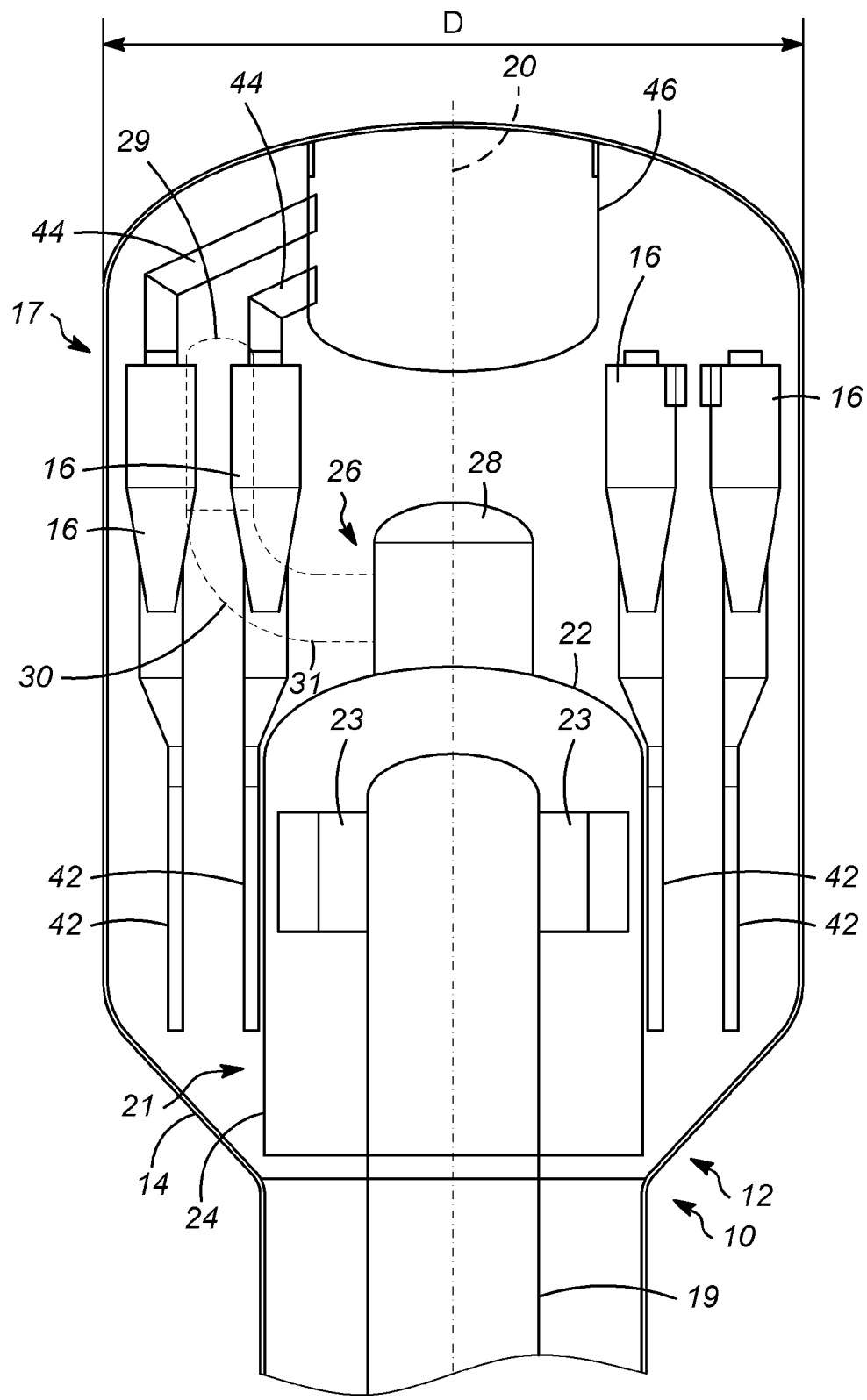
FIG. 4 is a schematic sectional elevational view showing an example of piping configurations according to the present invention.

Turning now to FIG. 3, another example of a catalyst separation device configuration will be described. FIG. 3 is a top view of the interior of the reactor 10, such as an FCC reactor, which, in a similar manner as FIG. 2, includes a vessel 12 defined by a vessel wall 14. Once again, the catalyst separation devices in this embodiment are cyclones 16, and the cyclones 16 are arranged in a plurality of clusters 17, but the alignment of the cyclones 16 within each of the clusters of FIG. 3 are shifted compared to those of FIG. 2. For example, in the FIG. 3 embodiment, cyclones 16A-16D are not symmetric with respect to the generally horizontal portion of the associated primary outlet pipe 30. Accordingly, in the FIG. 3 embodiment, the center points 18A, 18B, 18C and 18D of all of the four cyclones 16A, 16B, 16C, and 16D within one of the clusters 17 are arranged at all different radii from the center point 20 of the reactor vessel 12.

One of the benefits of the FIG. 3 configuration is that a cyclone of one cluster can be somewhat nested between two cyclones of an adjacent cluster. More specifically, a review of FIG. 3 shows how cyclone 18C of one cluster can be tucked into the space between cyclones 18A and 18D of an adjacent cluster. Such a configuration enables more clusters to be positioned within a smaller diameter vessel than other embodiments, such as the FIG. 2 embodiment. By way of example only, assuming that the diameter D of the reactor vessel of FIG. 2 is 16900 mm, the reactor vessel diameter of FIG. 3 can be reduced to 16300 mm, for the same number of cyclones, with the cyclones being the same size as in FIG. 2.

Now that various cluster configurations have been described, various options for the outlet piping from the chamber housed within the vessel, such as the primary disengaging chamber, to the cyclones will be described while viewing the elevational views of FIGS. 4-7. It should be noted that the views of FIGS. 4-7 are schematic views only, with certain components omitted, for the purpose of showing the locations and arrangements of the catalytic separation devices and/or the associated piping. One of ordinary skill in the art would be familiar with the missing components, and with the operation of the reactors within the desired processing unit, and thus such details need not be provided herein. Further, as mentioned above, the various outlet piping configurations described herein can be used with any of the cluster configurations described herein. Finally, the same reference numbers used in FIGS. 2 and 3 will be used for similar components in FIGS. 4-7.

Turning first to FIG. 4, this figure once again shows the reactor 10, where the vessel wall 14 defines the vessel 12 for enclosing the reactor components. As known in the art, the components within the vessel include a riser 19 that communicates with a plurality of disengagers 23). The riser 19 and disengagers 23 are seated within the chamber 21 (also referred to as a can or as a disengaging chamber, depending on the type of reactor). The chamber can be considered as including an upper surface 22 (or upper wall), and a side surface 24 (or side wall). In this embodiment, the upper surface 22 is a domed surface, and the side surface is cylindrical, but other configurations are contemplated. Briefly, the process within the reactor 10 includes allowing the cracked product vapor stream to travel up through the riser 19, and then out through disengagers 23, where catalyst separated from the vapor drops down and the vapor stream travels through the outlet piping 26 for the removal of the remaining catalyst particles via the cyclones 16.

Now an example of one configuration of the outlet piping 26 from the chamber 21 to the cyclones 16 will be described. One of the important considerations of the outlet piping 26 is that each cyclone 16 should receive the same flow, accordingly, the total outlet piping going to each cyclone is preferably of the same length and the same diameter. It should be noted that for ease of illustration, the piping is only shown on the left-hand side of FIG. 4, although similar piping would also be provided for the cyclones 16 on the right-hand side of the figure as well. In this embodiment, the outlet piping 26 includes an optional central outlet pipe 28 that leads from the top of the chamber 21 to a plurality of primary outlet pipes 30, where one primary pipe 30, which extends first radially outwardly and then upwardly, into portion 29, is associated with each cyclone cluster 17 (see FIGS. 2 and 3 also), and a plurality of cross-over ducts 32 (FIGS. 2 and 3), with one cross-over duct 32 being associated with each cyclone 16. Each of the cyclones 16 also further includes a cyclone outlet pipe 44 that extends from the outlet side of each cyclone to a plenum 46, from which the product vapor stream can exit the vessel 12.

Figure 5:
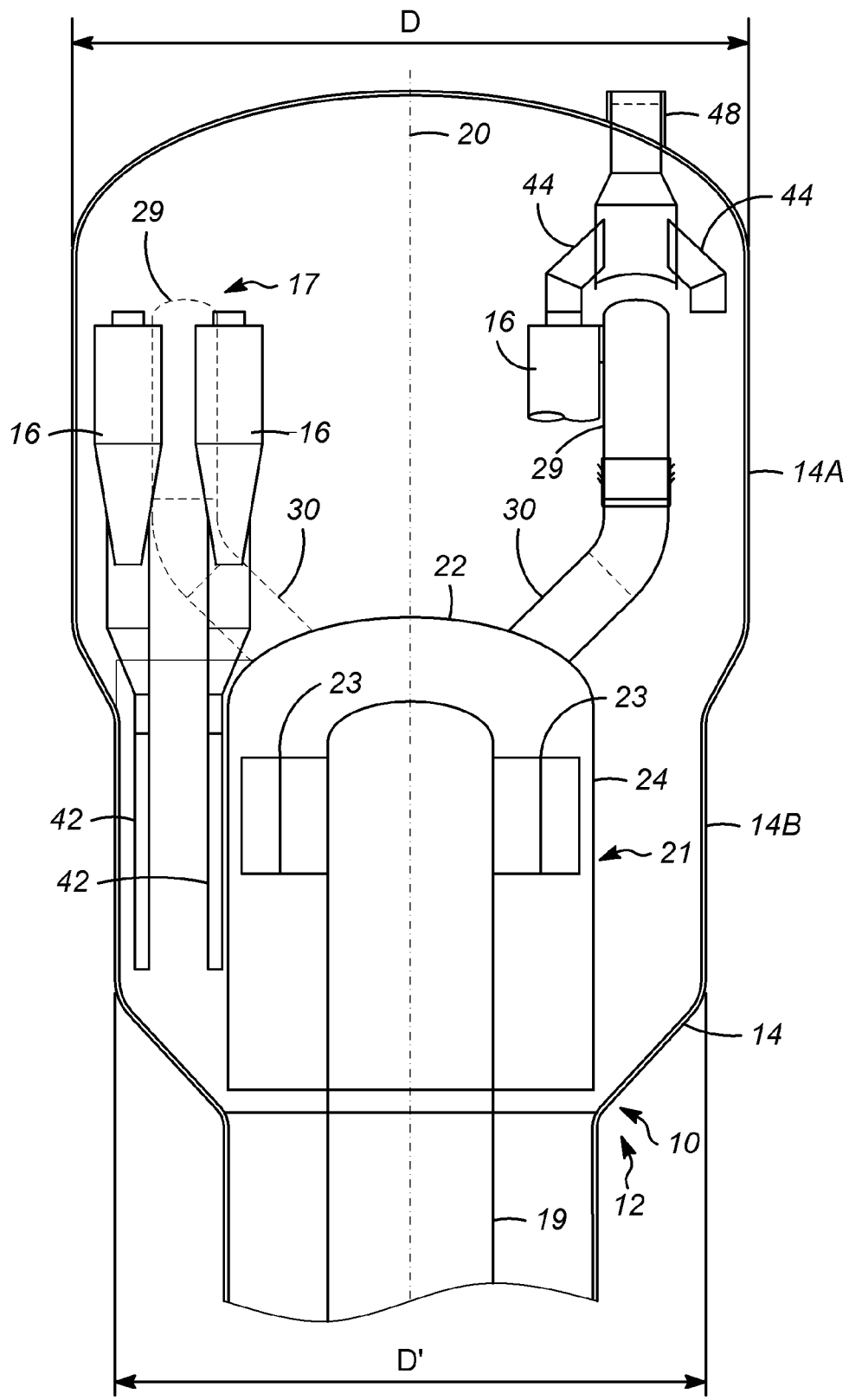
FIG. 5 is a schematic sectional elevational view showing other examples of piping configurations according to the present invention, as well as a modified reactor vessel.

Turning now to FIG. 5, another configuration of the piping will be described. As many of the features of the FIG. 5 configuration are the same as the FIG. 4 configuration only the differences will be described. One of the differences is that the FIG. 5 configuration lacks a central outlet pipe (such as central outlet pipe 28 of FIG. 4), and accordingly, the primary outlet pipes 30 extend directly from the top surface 22 of the chamber 21. In this embodiment the primary outlet pipes 30 extend at an angle from the top surface 22, and then bend into vertical portion 29 to be connected with the cross-over ducts 32 (FIGS. 2 and 3), which feed each of the cyclones 16 (only some of which are shown, or partially shown).

A second difference is that the FIG. 5 configuration lacks a common plenum (such as plenum 46 of FIG. 4), and instead includes separate plenum piping 48 for each of the clusters 17. Although the separate plenum piping 48 is only shown in the right-hand side of FIG. 5, such piping is provided for each of the clusters 17.

A third difference is that the reactor vessel 12 of the FIG. 5 embodiment includes first portion 14A of the vessel wall of a first diameter (D) and a second portion of the vessel wall 14B of a second diameter (D'), where the second diameter D' is less than the first diameter (D). Such a configuration is possible because of the shape of the dip legs 42, which are relatively thin compared to the remainder of the cyclone 16. By way of example only, assuming that diameter D is 15800 mm, diameter D' could be 13800 mm. It is expected that that the diameter D' of the reduced diameter portion 14B could be between approximately 70 and approximately 90% of the diameter D of the other portion 14A of the vessel wall.

Figure 6:
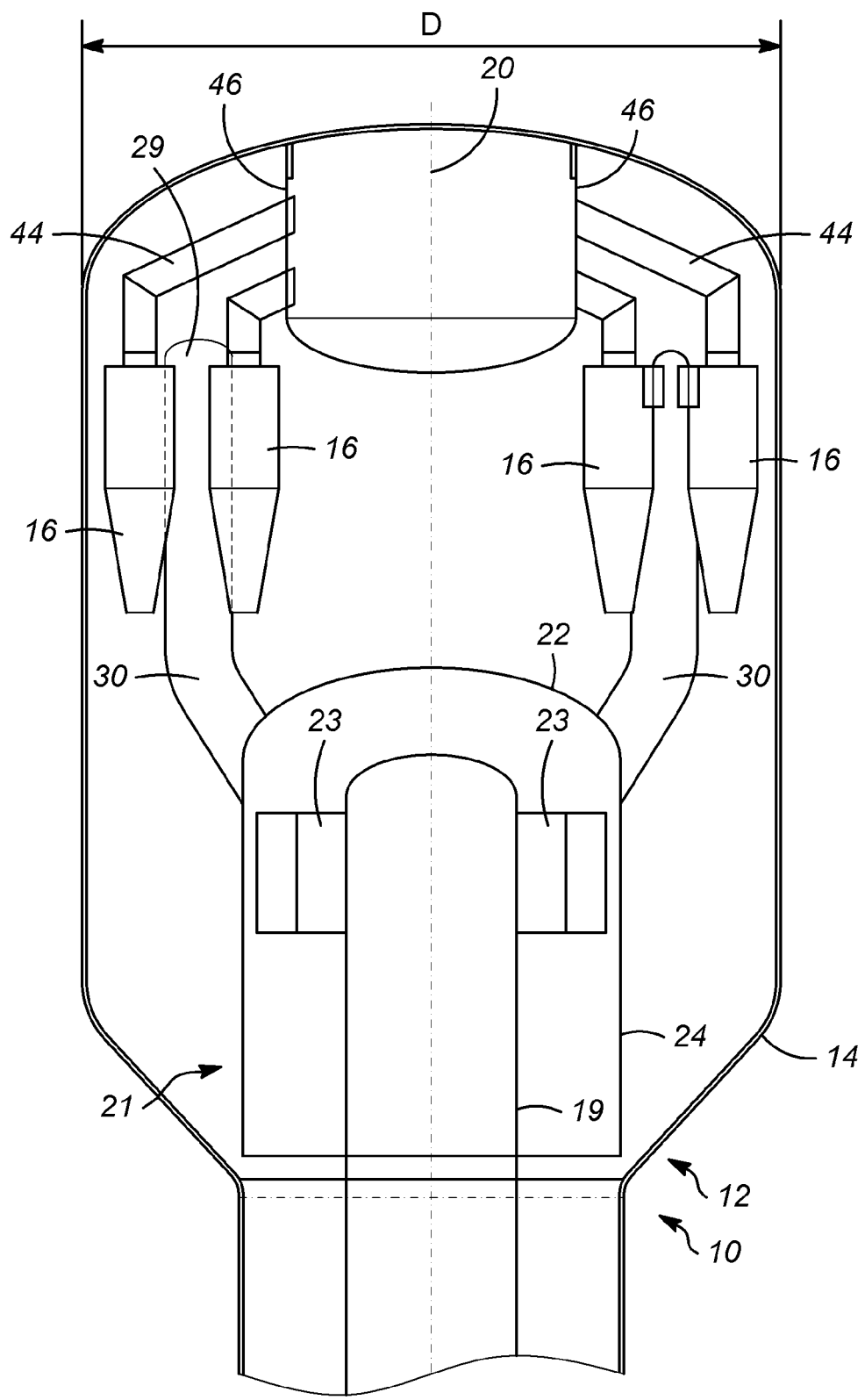
FIG. 6 is a schematic sectional elevational view showing other examples of piping configurations according to the present invention.

Turning now to FIG. 6, another configuration will be described. It should be noted that in this figure, the dip legs (such as dip legs 42 of FIGS. 4 and 5) are not shown in the figure so that the primary outlet pipes 30 can be more clearly seen. One of the main features that differentiates this configuration from that of the other configurations relates to the primary outlet pipes 30. More specifically, in this configuration, the primary outlet pipes 30 extend partially from the side surface 24 of the chamber 21 and partially from the upper surface 22 (as distinct from extending only from the upper surface 22 in the FIG. 5 configuration). In this embodiment, the primary outlet pipes 30 extend at an angle, such as between 0 degrees (i.e., horizontal) and 45 degrees from the side surface 24, and then bend into a vertical portion.

Figure 7:
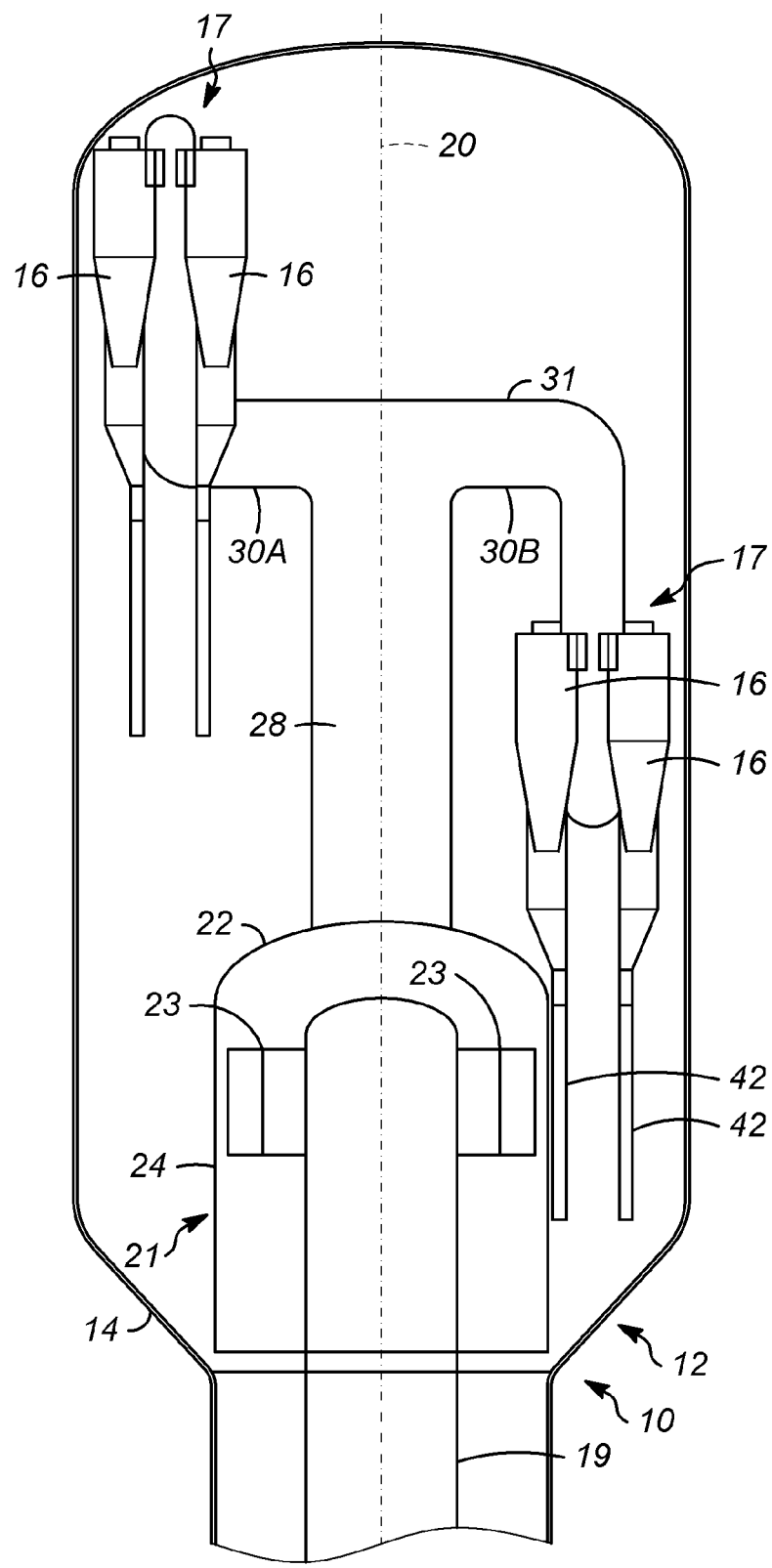
FIG. 7 is a schematic sectional elevational view showing other examples of piping configurations according to the present invention.

FIG. 7 (which is shown with an elongated reactor vessel 12 to better illustrate the piping configuration) shows two different options for the primary outlet pipe, where the left side of the figure shows an example of primary outlet pipe 30A, which originates with a horizontal portion and then bends upwardly into a vertical portion from below the cyclones 16, and where the right side of the figure shows an example of primary outlet pipe 30B, which also originates with a horizontal portion, but then bends downwardly into a vertical portion from above the cyclones 16. Although both primary outlet pipes 30A and 30B could be used within one reactor, a more likely scenario would be to use either a plurality of primary outlet pipes 30A or a plurality of outlet pipes 30B. It should be noted that in this configuration using primary outlet pipes 30A and/or 30B, the upper end of the central outlet pipe 28 preferably terminates in a flat top portion 31 that merges into the horizontal portions of primary outlet pipes 30A and/or 30B.

Figure 8:
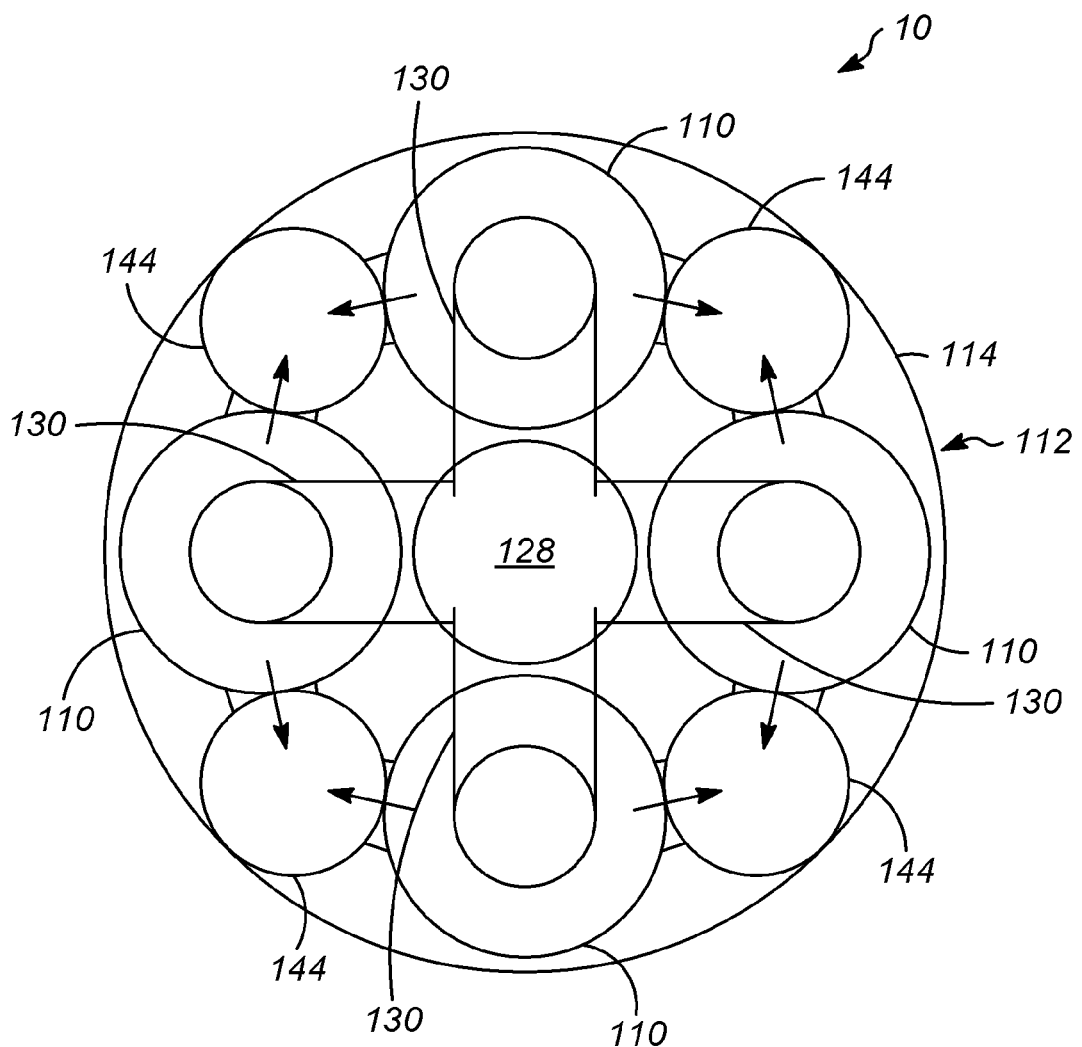
FIG. 8 is a schematic overhead view of one example of a reactor including a separator configuration of the present invention.
Figure 9:
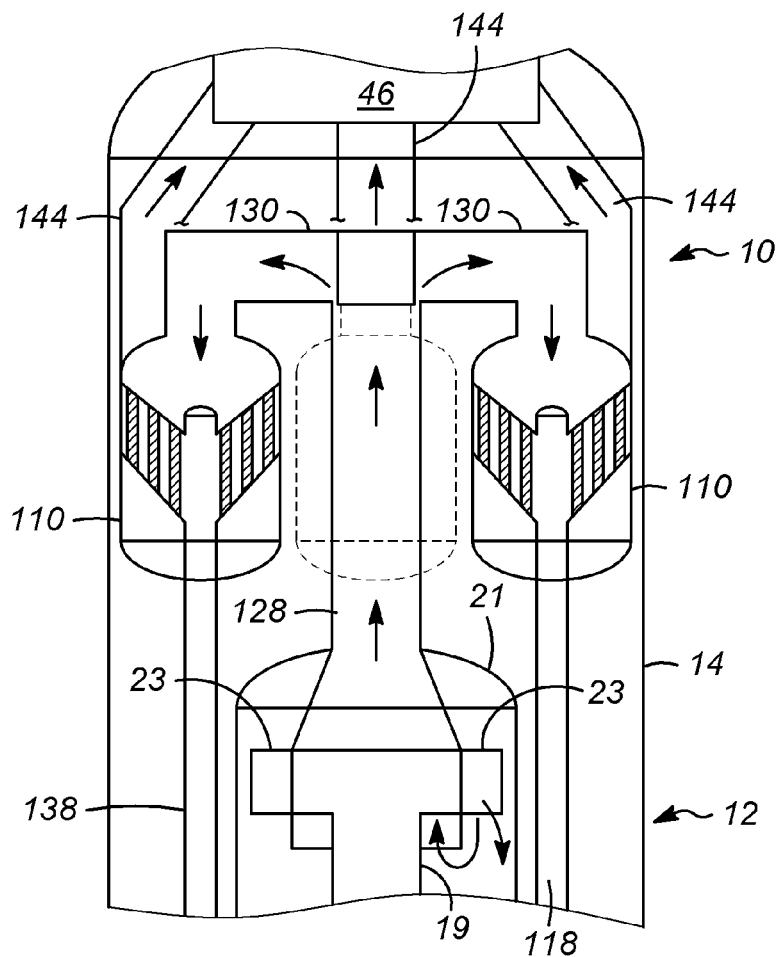
FIG. 9 is a schematic sectional elevational view of the reactor of FIG. 8.
Figure 10:
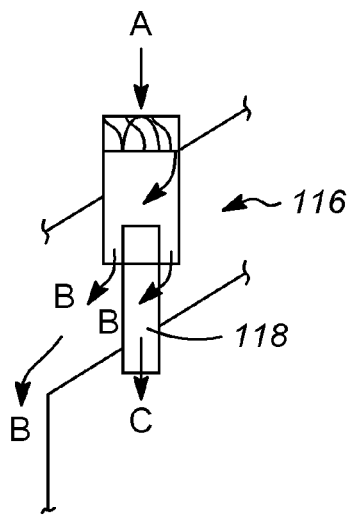
FIG. 10 is a schematic view of one of the multiple cyclonic devices within each separator vessel of FIG. 9.

Turning now to FIGS. 8-10, an embodiment related to a reactor vessel, with a plurality of catalytic separation devices, such as second stage separators (following the primary separator) will be described, where FIG. 8 is a schematic top view of reactor 10, FIG. 9 is a schematic elevational view of reactor 10, and FIG. 10 is a schematic view of one of the cyclonic devices within one of the second stage separators.

The embodiment of FIGS. 8-10 includes some similar components to those of the earlier-described embodiments (such as vessel 12, vessel wall 14, riser 19, disengagers 23, chamber 21, plenum 46, etc.), and therefore the same reference numbers will be used, and further discussion of these components is not necessary. One of the differences between the embodiment of FIGS. 8-10 and the earlier-described embodiments is that this embodiment includes a plurality of multiple cyclonic devices 116 within the catalytic separation devices 110, with four second stage separators being shown in the figures (best seen in FIG. 8), but with different quantities of catalytic separation devices being contemplated.

As can be seen in FIGS. 8 and 9, where FIG. 9 includes arrows showing the flow of the vapor stream and separated catalyst, this embodiment includes a central outlet pipe 128 in communication with the riser 19, and four primary outlet pipes 130 (one for each catalytic separation device 110). Each of the primary outlet pipes 130 serve as an outlet from the central outlet pipe 128 and an inlet of the associated catalytic separation device 110 (such as a second stage separator). There are also four separator gas outlet pipes 144 that direct the vapor stream from the catalytic separation devices 110 to the plenum 46. As can be seen by the arrows in FIG. 8, each of the catalytic separation devices 110 feeds into two of the separator gas outlet pipes 144 in this embodiment. Accordingly, the catalytic separation devices 110 (second stage separators) are in communication with plenum 46 via separator outlet piping 144, and each of the catalytic separation devices 110 feeds an outlet vapor stream into at least two different separator outlet piping members 144. Further, preferably in this embodiment, each of the separator gas outlet piping members 144 receives an outlet vapor stream from at least two catalytic separation devices 110. However, it is also contemplated that each separator gas outlet pipe 144 receives an outlet vapor stream from only one catalytic separation device 110, or that some separator gas outlet pipes 144 receives an outlet vapor stream from only one catalytic separation device and some separator gas outlet pipes 144 receives an outlet vapor stream from two different catalytic separation devices 110. For example, a configuration with three catalytic separation devices stage separators 110 could include two separator gas outlet pipes 144, where one separator gas outlet pipe receives an outlet vapor stream from two of the three second stage separators, and the other separator gas outlet pipe receives an outlet vapor stream from the remaining catalytic separation devices.

Briefly, the operation of one of the cyclonic devices 116 in the catalytic separation devices 110 of this embodiment will be described while referring to FIG. 10. The gas stream, which includes catalyst particles, enters the cyclonic device 116 as shown by arrow A, where the catalyst particles are separated out by cyclonic action and follow the path represented by arrows B and the gas stream exits the cyclonic device 116 via gas outlet 118, as represented by arrow C. Catalyst particles following the path represented by arrows B will be collected in catalyst pipe 138. The gas stream represented by arrow C will be collected in separator gas outlet pipe 144. Processing of the combined vapor and catalyst stream before the cyclonic devices and of the separated vapor stream and catalyst particles after the cyclonic devices can be performed in any desired manner, as would be known to those of ordinary skill in the art.

While several exemplary embodiments have been presented in the foregoing detailed description of the invention, it should be appreciated that a vast number of variations exist. It should also be appreciated that the exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It is understood that various changes may be made in the function and arrangement of elements described in an exemplary embodiment without departing from the scope of the invention as set forth in the appended claims.

What is claimed is:

1. A fluid catalytic cracking reactor comprising:
   a vessel defined by a vessel wall;
   a chamber housed within the vessel, wherein said chamber is defined by an upper surface and at least one side surface; and
   a plurality of cyclones housed within the vessel, but externally of the chamber,
   wherein said plurality of cyclones are arranged in a plurality of cyclone clusters, where each of said cyclone clusters comprises a grouping of at least two of said cyclones that share common outlet piping for communication with said chamber.

2. The reactor according to claim 1, wherein said outlet piping extends from the upper surface of said chamber.

3. The reactor according to claim 1, wherein said outlet piping extends from said at least one side surface of said chamber.

4. The reactor according to claim 1, wherein said outlet piping comprises:
   a central outlet pipe originating from the upper surface of said chamber, wherein said central outlet pipe includes a top wall and at least one side wall; and
   a plurality of primary outlet pipes, wherein each of said primary outlet pipes is configured and arranged for communication between said central outlet pipe and said cyclones of one of said cyclone clusters.

5. The reactor according to claim 4, wherein each of said primary outlet pipes extends from said at least one side wall of said central outlet pipe.

6. The reactor according to claim 4, wherein each of said primary outlet pipes extends from the top wall of said central outlet pipe.

7. The reactor according to claim 1, wherein:
   said outlet piping comprises primary outlet pipes in communication between said chamber and said cyclones of an associated one of said cyclone clusters, but not in communication with cyclones of another one of said cyclone clusters.

8. The reactor according to claim 7, wherein said outlet piping further comprises a plurality of cross-over ducts, wherein each of said cross-over ducts is configured and arranged to communicate between one of said cyclones and said primary outlet pipe of said associated cyclone cluster.

9. The reactor according to claim 1, wherein:
   said vessel wall of said chamber comprises a cylindrical side wall, and
   said cylindrical side wall of said vessel comprises a first portion of a first diameter and a second portion of a second diameter, and wherein said second diameter is less than said first diameter.

10. The apparatus of claim 1, wherein said outlet piping comprises a primary outlet pipe with a manifold portion and all of said cyclones in said cluster are symmetric about said manifold portion.

11. The apparatus of claim 1, wherein each of said cyclone clusters comprises between two cyclones and eight cyclones.

12. A fluid catalytic cracking reactor comprising:
   a vessel;
   a chamber housed within the vessel; and
   a plurality of cyclones housed within the vessel, but externally of the chamber,
   wherein said plurality of cyclones are arranged in a plurality of cyclone clusters, with each of said cyclone clusters including a plurality of said cyclones,
   wherein said cyclones are in communication with said chamber via outlet piping,
   wherein said outlet piping includes primary outlet pipes configured and arranged to communicate between said chamber and each of said cyclone clusters, with one of said primary outlet pipes being associated with each of said cyclone clusters, and
   wherein the number of said cyclone clusters is the same as the number of said primary outlet pipes.

13. The fluid catalytic cracking reactor according to claim 12, wherein:
   said vessel includes a vessel center point in plan view;
   each of said cyclones includes a cyclone center point in plan view; and
   said cyclone center points of each of said cyclones within one of said cyclone clusters cyclone clusters is at a different radius with respect to said vessel center point.

14. The fluid catalytic cracking reactor according to claim 12, wherein:
   said vessel includes a vessel center point in plan view;
   each of said cyclones includes a cyclone center point in plan view; and
   said cyclone center points of two of said cyclones within one of said cyclone clusters cyclone clusters are at a same radius with respect to said vessel center point.

15. The fluid catalytic cracking reactor according to claim 12, wherein:
   each of said cyclone clusters includes at least three of said cyclones;
   said vessel includes a vessel center point in plan view;
   each of said cyclones includes a cyclone center point in plan view; and said cyclone center points of each of said cyclones within one of said cyclone clusters cyclone clusters is at a different radius with respect to said vessel center point.

16. The fluid catalytic cracking reactor according to claim 12, wherein:
   each of said cyclone clusters includes an even number of said cyclones;
   said vessel includes a vessel center point in plan view;
   each of said cyclones includes a cyclone center point in plan view; and
   said cyclone center points of said cyclones within one of said cyclone clusters cyclone clusters are on at least two different radii with respect to said vessel center point.

17. The fluid catalytic cracking reactor according to claim 12, wherein:
   each of said cyclone clusters includes at least four of said cyclones;
   said vessel includes a vessel center point in plan view;
   each of said cyclones includes a cyclone center point in plan view; and
   said cyclone center points of adjacent pairs of said cyclones within one of said cyclone clusters cyclone clusters are at the same radius with respect to said vessel center point.

18. A fluid catalytic cracking reactor comprising:
   a vessel;
   a chamber housed within the vessel; and
   a plurality of catalytic separation devices housed within the vessel, but externally of the chamber,
   wherein said catalytic separation devices are in communication with said chamber via outlet piping, and further wherein said outlet piping includes primary outlet pipes configured and arranged to communicate between said chamber and each of said catalytic separation devices, with one of said primary outlet pipes being associated with each of said catalytic separation devices.

19. The fluid catalytic cracking reactor according to claim 18, wherein said catalytic separation devices are also in communication with a plenum via separator gas outlet piping, and further wherein at least one of said catalytic separation devices feeds an outlet vapor stream into at least two different separator gas outlet piping members, and at least one of said separator gas outlet piping members receives an outlet vapor stream from at least two different catalytic separation devices.

20. The fluid catalytic cracking reactor according to claim 18, wherein:
   each of said catalytic separation devices includes a plurality of cyclones.

* * * * *